United States Patent
Yu et al.

(10) Patent No.: US 11,282,182 B2
(45) Date of Patent: Mar. 22, 2022

(54) IMAGE PROCESSING METHOD AND APPARATUS, COMPUTER-READABLE MEDIUM, AND ELECTRONIC DEVICE

(71) Applicant: Tencent Technology (Shenzhen) Company Limited, Shenzhen (CN)

(72) Inventors: Le Yu, Shenzhen (CN); Neng Liu, Shenzhen (CN); Huiying Zhu, Shenzhen (CN); Youwei Hua, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 0 days.

(21) Appl. No.: 16/996,145

(22) Filed: Aug. 18, 2020

(65) Prior Publication Data
US 2020/0380660 A1   Dec. 3, 2020

Related U.S. Application Data

(63) Continuation of application No. PCT/CN2019/090397, filed on Jun. 6, 2019.

(30) Foreign Application Priority Data

Jul. 12, 2018   (CN) .......................... 201810763192.X

(51) Int. Cl.
*G06K 9/00* (2022.01)
*G06T 7/00* (2017.01)
(Continued)

(52) U.S. Cl.
CPC .............. *G06T 7/0002* (2013.01); *G06T 7/20* (2013.01); *G06T 7/70* (2017.01); *G06T 13/80* (2013.01); *G06V 20/20* (2022.01); *G06V 40/174* (2022.01)

(58) Field of Classification Search
CPC ........... G06T 7/0002; G06T 7/70; G06T 7/20; G06T 13/80; G06T 11/60; G06T 3/40;
(Continued)

(56) References Cited

U.S. PATENT DOCUMENTS

2015/0213604 A1*   7/2015   Li ...................... G06K 9/00315
345/473
2016/0260204 A1*   9/2016   Yu .......................... H04N 5/265
(Continued)

FOREIGN PATENT DOCUMENTS

CN   104637078 A   5/2015
CN   106658079 A   5/2017
(Continued)

OTHER PUBLICATIONS

International Search Report and Written Opinion with English Translation for International Patent Application No. PCT/CN2019/090397 dated Aug. 21, 2019; 11 pages.

*Primary Examiner* — Dhaval V Patel
(74) *Attorney, Agent, or Firm* — Crowell & Moring LLP

(57) ABSTRACT

Embodiments of this disclosure provide an image processing method and apparatus, a computer-readable medium, and an electronic device. The image processing method includes: obtaining a to-be-processed image; determining a to-be-processed object in the to-be-processed image, the to-be-processed object comprising at least one of a human face, an animal face, or a cartoon character face; selecting a reference animated image to be applied to the to-be-processed image; processing the to-be-processed image according to the reference animated image, to generate a plurality of frames of images, each frame of the plurality of frames of images comprising the to-be-processed object; and composing the plurality of frames of images into a target animated image.

17 Claims, 8 Drawing Sheets

(51) Int. Cl.
*G06T 7/70* (2017.01)
*G06T 7/20* (2017.01)
*G06T 13/80* (2011.01)
*G06V 20/20* (2022.01)
*G06V 40/16* (2022.01)

(58) Field of Classification Search
CPC ........... G06K 9/00302; G06K 9/00671; G06K 9/00228
See application file for complete search history.

(56) References Cited

U.S. PATENT DOCUMENTS

2017/0345196 A1* 11/2017 Tanaka ................. G06T 5/50
2018/0144214 A1* 5/2018 Hsieh ................... G06K 9/036

FOREIGN PATENT DOCUMENTS

| CN | 108259754 A | 7/2018 |
|----|-------------|--------|
| WO | WO 2016/031573 | 3/2016 |

* cited by examiner

IMAGE PROCESSING METHOD AND APPARATUS, COMPUTER-READABLE MEDIUM, AND ELECTRONIC DEVICE

RELATED APPLICATION

This application is a continuation application of the International PCT Application No. PCT/CN2019/090397, filed with the China National Intellectual Property Administration, PRC on Jun. 6, 2019, which claims priority to Chinese Patent Application No. 201810763192.X, entitled "IMAGE PROCESSING METHOD AND APPARATUS, COMPUTER-READABLE MEDIUM, AND ELECTRONIC DEVICE" and filed with the China National Intellectual Property Administration, PRC on Jul. 12, 2018, which are incorporated herein by reference in their entireties.

FIELD OF THE TECHNOLOGY

This disclosure relates to the field of computer and communications technologies, and specifically, to a method, an apparatus, a computer-readable non-transitory medium, and an electronic device for image processing.

BACKGROUND OF THE DISCLOSURE

Nowadays, using a camera of a terminal device to take a photograph becomes a common entertainment manner of users. In an existing terminal device, a camera has many photographing functions, such as selfie-taking, and panorama shooting. However, the functions still cannot bring users enough fun.

Therefore, a new image processing method and apparatus, a new computer-readable non-transitory medium, and a new electronic device are required.

SUMMARY

The objective of embodiments of this disclosure is to provide an image processing method and apparatus, a computer-readable non-transitory medium, and an electronic device, to further overcome, at least to some extent, the problem that fun of an image is not enough in the related art.

According to an aspect of the embodiments of this disclosure, an image processing method is provided, performed by an electronic device, the method including: obtaining a to-be-processed image; determining a to-be-processed object in the to-be-processed image, the to-be-processed object including at least one of a human face, an animal face, or a cartoon character face; selecting a reference animated image applied to the to-be-processed image; processing the to-be-processed image according to the reference animated image, to generate a plurality of frames of processed images, each frame of the plurality of frames of processed images including the to-be-processed object; and composing the plurality of frames of processed images to obtain a target animated image.

According to an aspect of the embodiments of the present disclosure, an image processing apparatus is provided, including: a to-be-processed image obtaining module, configured to obtain a to-be-processed image; a to-be-processed object determining module, configured to determine a to-be-processed object in the to-be-processed image; a reference animated image selection module, configured to select a reference animated image applied to the to-be-processed image; an image processing module, configured to process the to-be-processed image according to the reference animated image, to generate a plurality of frames of processed images, each frame of the plurality of frames of processed images including the to-be-processed object; and an image composition module, configured to compose the plurality of frames of processed images into a target animated image.

According to an aspect of the embodiments of the present disclosure, a non-transitory storage medium is provided, storing a processor executable instruction, the instruction, when executed by one or more processors, implementing the image processing method according to the foregoing embodiments.

According to an aspect of the embodiments of the present disclosure, an electronic device is provided, including: one or more processors; and a storage apparatus, configured to store one or more programs, the one or more programs, when executed by the one or more processors, causing the one or more processors to implement the image processing method according to the foregoing embodiments.

BRIEF DESCRIPTION OF THE DRAWINGS

Accompanying drawings herein are incorporated into the specification and form a part of this specification, show embodiments that conform to this disclosure, and are used to describe a principle of this disclosure together with this specification. Apparently, the accompanying drawings described below are only some embodiments of this disclosure, and a person of ordinary skill in the art may obtain other drawings according to these accompanying drawings without creative efforts. In the accompanying drawings.

DESCRIPTION OF EMBODIMENTS

Exemplary implementations are now described more comprehensively with reference to the accompanying drawings. However, the exemplary embodiments may be implemented in various forms and are not be understood as limited to examples herein; on the contrary, providing these embodiments will make this disclosure more comprehensive and complete, and comprehensively convey a concept of the exemplary embodiments to a person skilled in the art.

In addition, described features, structures or features may be combined in one or more embodiments in any suitable manner. In the following description, many specific details are provided to give a full understanding of the embodiments of this disclosure. However, a person skilled in the art will realize that the technical solution of this disclosure can be practiced without one or more specific details, or other methods, components, devices, steps and the like can be adopted. In other cases, public methods, devices, implementations or operations are not shown or described in detail to avoid blurring aspects of this disclosure.

The block diagram shown in the accompanying drawings is merely a functional entity and does not necessarily correspond to a physically independent entity. That is, these functional entities can be implemented in a form of a software, in one or more hardware modules or integrated circuits, or in different network and/or processor devices and/or microcontroller devices.

A flowchart shown in the accompanying drawings is only an exemplary description, not necessarily including all contents and operations/steps, nor it be carried out in the order described. For example, some operations/steps can also be decomposed, while some operations/steps can be merged or partially merged, so the actual execution order may change according to the actual situation.

Figure 1:
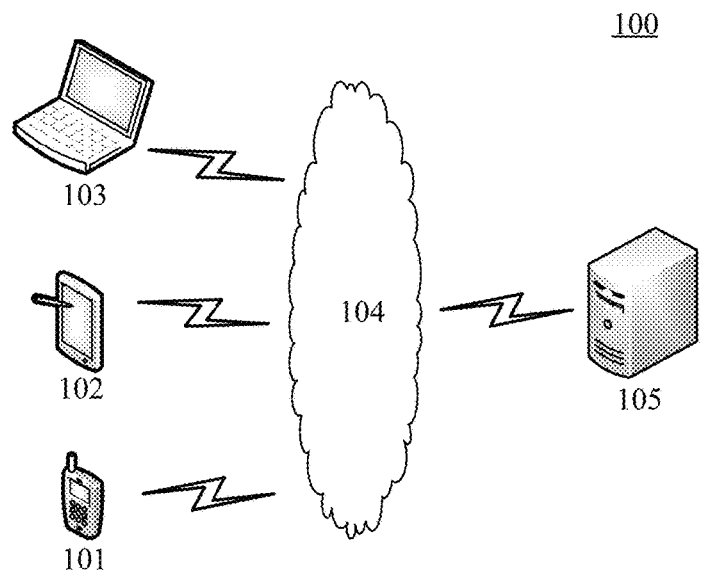
FIG. 1 is a schematic diagram of an exemplary system architecture to which an image processing method or an image processing apparatus according to an embodiment of this disclosure may be applied.

FIG. 1 is a schematic diagram of an exemplary system architecture 100 to which an image processing method or an image processing apparatus according to an embodiment of this disclosure may be applied.

As shown in FIG. 1, the system architecture 100 may include one or more of terminal devices 101, 102, and 103, a network 104, and a server device 105. The network 104 is configured to provide a communication link medium between the terminal devices 101, 102, and 103 and the server device 105. The network 104 may include various connection types, such as a wired or wireless communication link, or a fiber optic cable.

It is to be understood that quantities of terminal devices, networks, and server devices in FIG. 1 are only schematic. According to implementation requirements, there may be any quantity of terminal devices, networks, and server devices. For example, the server device 105 may be a server device cluster formed by a plurality of server devices, or the like.

A user may use the terminal devices 101, 102, and 103 to interact with the server device 105 through the network 104, to receive or send messages, or the like. The terminal devices 101, 102, and 103 may be various electronic devices with display screens, including but not limited to, smartphones, tablets, portable computers, desktop computers, intelligent chatterbots, and the like.

The server device 105 may be a server device providing various services. For example, the user sends an image processing request to the server device 105 by using the terminal device 103 (or the terminal device 101 or 102). The server device 105 may process, based on a to-be-processed image carried in the image processing request, a to-be-processed object in the to-be-processed image, and a reference animated image selected by the user, the to-be-processed image, to generate a plurality of frames of processed images, compose the plurality of frames of processed images into a target animated image, and send the composed target animated image to the terminal device 103. The user may further determine relationships between different entities based on content displayed on the terminal device 103, and preview the composed target animated image. The plurality of frames of processed images are a plurality of frames of images after the processing, that is, may also be understood as processed images including a plurality of frames of images.

Figure 2:
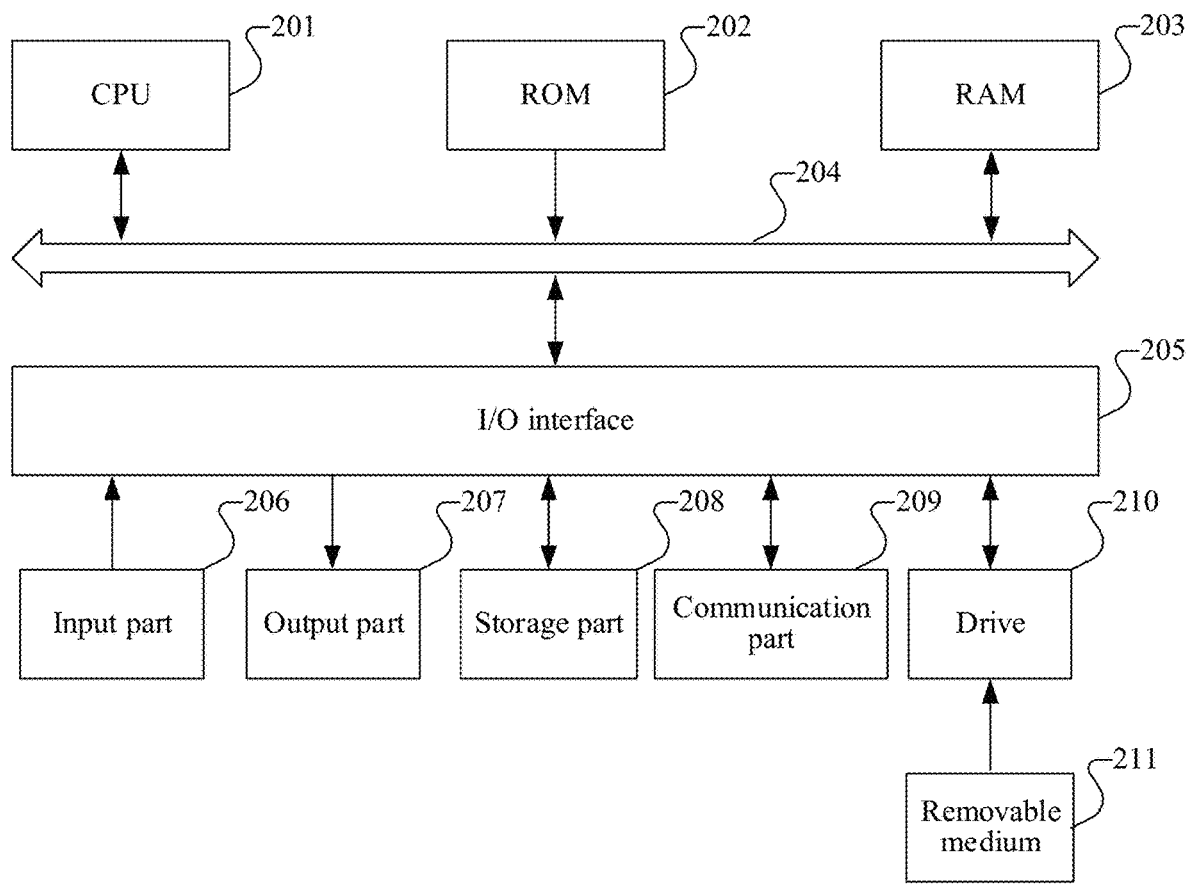
FIG. 2 is a schematic structural diagram of a computer system adapted to implement an electronic device according to an embodiment of this disclosure.

FIG. 2 is a schematic structural diagram of a computer system adapted to implement an electronic device according to an embodiment of this disclosure.

A computer system 200 of the electronic device shown in FIG. 2 is only an example, and does not impose any restriction on functions and scopes of use of the embodiments of this disclosure.

As shown in FIG. 2, the computer system 200 includes a central processing unit (CPU) 201. It can perform various proper actions and processing based on a program stored in a read-only memory (ROM) 202 or a program loaded from a storage part 208 into a random access memory (RAM) 203. The RAM 203 also stores various programs and data required to operate the system. The CPU 201, the ROM 202, and the RAM 203 are connected to each other through a bus 204. An input/output (I/O) interface 205 is also connected to the bus 204.

The following components are connected to the I/O interface 205: an input part 206 including a keyboard, a mouse, or the like; an output part 207 including a cathode ray tube (CRT), a liquid crystal display (LCD), a speaker, or the like; a storage part 208 including a hard disk, or the like; and a communication part 209 including a network interface card such as a LAN card, a modem, or the like. The communication part 209 performs communication processing through a network such as the Internet. A drive 210 is further connected to the I/O interface 205 as needed. A removable medium 211, such as a magnetic disk, an optical disk, a magneto-optical disk, a semiconductor memory or the like, is installed on the drive 210 as needed, so that a computer program read therefrom is installed into the storage part 208 as needed.

Particularly, according to an embodiment of this disclosure, the processes described in the following by referring to the flowcharts may be implemented as computer software programs. For example, an embodiment of this disclosure includes a computer program product, the computer program product includes a computer program carried on a computer-readable medium, and the computer program includes program code used for performing the methods shown in the flowcharts. In such an embodiment, the computer program may be downloaded and installed through the communication part 209 from a network, and/or installed from the removable medium 211. When the computer program is executed by the CPU 201, the various functions defined in the method and/or apparatus of this disclosure are executed.

The computer-readable medium shown in this disclosure may be a computer-readable signal medium or a computer-readable storage medium or any combination of the two. The computer-readable storage medium may be, for example, but not limited to, an electrical, magnetic, optical, electromagnetic, infrared, or semiconductor system, apparatus, or device, or any combination thereof. A more specific example of the computer-readable storage medium may include, but is not limited to: an electrical connection with one or more wires, a portable computer disk, a hard disk, a random access memory (RAM), a read-only memory (ROM), an erasable programmable read-only memory (EPROM or a flash memory), an optical fiber, a portable compact disc read-only memory (CD-ROM), an optical storage device, a magnetic storage device, or any suitable combination thereof. In this disclosure, the computer-readable storage medium may be any tangible medium containing or storing a program, and the program may be used by or used in combination with an instruction execution system, an apparatus, or a device. The storage medium provided in this disclosure stores a processor executable instruction, the instruction, when executed by one or more processors, implementing the image processing method according to any one of FIG. 3 to FIG. 4, FIG. 6 to FIG. 7, FIG. 8 to FIG. 9, and FIG. 10 to FIG. 11. In addition, in this disclosure, a computer-readable signal medium may include a data signal being in a baseband or propagated as a part of a carrier, the data signal carrying computer-readable program code. The propagated data signal may have various forms, including but not limited to an electromagnetic signal, an optical signal, or any suitable combination thereof. The computer-readable signal medium may alternatively be any computer-readable medium other than the computer-readable storage medium. The computer-readable medium may send, propagate or transmit a program for use by or in combination with an instruction execution system, apparatus or a component. The program code contained in the computer-readable medium may be transmitted by using any appropriate medium, including but not limited to: a wireless medium, a wire, an optical cable, RF, any suitable combination thereof, or the like.

The flowcharts and block diagrams in the accompanying drawings show architectures, functions, and operations that may be implemented for the method, the apparatus, and the computer program product according to the embodiments of this disclosure. In this regard, each block in the flowchart or the block diagram may represent a module, a program segment, or a part of code. The module, the program segment, or the part of the code includes one or more executable instructions for implementing a specified logical function. In some alternative implementations, functions noted in the blocks may also occur out of the order noted in the drawings. For example, depending on functions involved, two blocks represented in succession may actually be executed in parallel, or may sometimes be executed in reverse order. Each block in the block diagram or the flowchart and a combination of blocks in the block diagram or the flowchart may be implemented by a dedicated hardware-based system that performs a prescribed function or operation, or may be implemented by using a combination of dedicated hardware and computer instructions.

A related module and/or submodule and/or unit and/or subunit described in the embodiments of this disclosure may be implemented in a software manner, or may be implemented in a hardware manner, and the described module and/or submodule and/or unit and/or subunit can also be set in a processor. Names of the modules and/or submodules and/or units and/or subunits do not constitute a limitation on the modules and/or submodules and/or units and/or subunits in a specific case.

According to another aspect, this disclosure further provides a computer-readable non-transitory medium. The computer-readable non-transitory medium may be included in the electronic device described in the foregoing embodiments, or may exist alone and is not disposed in the electronic device. The computer-readable non-transitory medium carries one or more programs, the one or more programs, when executed by the electronic device, causing the electronic device to implement the method described in the following embodiment. For example, the electronic device may implement steps shown in FIG. 3, FIG. 4, FIG. 6, FIG. 7, FIG. 8, FIG. 9, FIG. 10, or FIG. 11.

Figure 3:
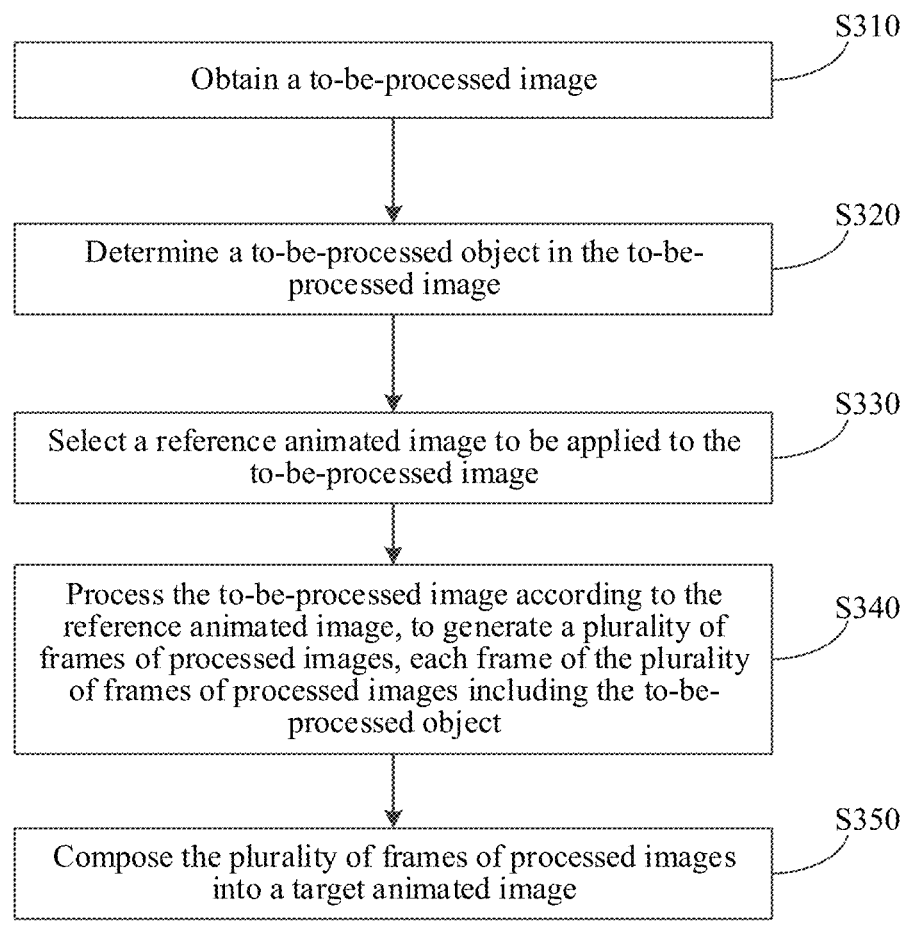
FIG. 3 is a schematic flowchart of an image processing method according to an embodiment of this disclosure.

FIG. 3 is a schematic flowchart of an image processing method performed by an electronic device according to an embodiment of this disclosure.

As shown in FIG. 3, the image processing method provided by this implementation of this disclosure may include the following steps:

Step S310: Obtain a to-be-processed image.

In an exemplary embodiment, the obtaining a to-be-processed image may include: determining the to-be-processed image in response to an operation on an image list.

For example, the image list may be a photograph list stored locally in a mobile terminal of a user. In another example, the image list may alternatively be a photograph list or a picture list that is stored in a remote server device connected through a network. This is not limited in this disclosure.

Step S320: Determine a to-be-processed object in the to-be-processed image, the to-be-processed object including at least one of a human face, an animal face, or a cartoon character face.

For example, the to-be-processed object may be a human face in the to-be-processed image. In another example, the to-be-processed object may alternatively be the face of one or more animals, such as a cat or a dog, in the to-be-processed image. In the following embodiments, description is made by using an example in which the to-be-processed object is a human face, but there is no limitation imposed in this disclosure.

Step S330: Select a reference animated image applied to the to-be-processed image.

In an exemplary embodiment, the method may further include: pre-storing at least one animated image template. According to a visual effect that a designer intends to achieve, in each animated image template, various parameters, such as a total frame quantity of images desired, and whether each frame of image in the target animated image is rotated, may be designed and configured, and a total rotation angle may further be set in a case that the target animated image is set to rotate.

In some embodiments, the user may select one or more of the at least one animated image template as the reference animated image of the to-be-processed image. In some other embodiments, alternatively, a system may recognize a facial expression of the to-be-processed object, and automatically recommend a corresponding animated image template as the reference animated image according to a facial expression detection result.

Step S340: Process the to-be-processed image according to the reference animated image, to generate a plurality of frames of processed images, each frame of the plurality of frames of processed images including the to-be-processed object.

In this embodiment of this disclosure, corresponding processing may be performed on the to-be-processed image according to the reference animated image. For example, each frame of image in the plurality of frames of processed images may be generated through an operation such as scaling the to-be-processed image, panning the to-be-processed object in the to-be-processed image, rotating the to-be-processed image, or cropping each frame of image according to a set specified size.

In this embodiment of this disclosure, if the reference animated image scales up the to-be-processed object frame by frame, when the to-be-processed object, such as a face, is scaled up, a background of the to-be-processed image may be proportionally or un-proportionally scaled up with the face. However, this disclosure is not limited thereto.

In this embodiment of this disclosure, if the reference animated image performs transformation operations such as translation and/or rotation on the to-be-processed object, the transformation operations such as translation and/or rotation may also be applied to the entire to-be-processed image. However, this disclosure is not limited thereto.

Step S350: Compose the plurality of frames of processed images into a target animated image.

The steps in the image processing method provided by this implementation of this disclosure may be performed by a terminal device (for example, the terminal devices 101, 102, and 103 in FIG. 1), or may be performed by a server device (for example, the server device 105 in FIG. 1), or may be partially performed by a terminal device, and partially performed by a server device. The terminal device and the server device may interact with each other through a network connection. This is not limited in this disclosure, and may be selected and adjusted according to an actual application scenario.

Through the image processing method provided by this implementation of this disclosure, a to-be-processed image is obtained, and a to-be-processed object in the to-be-processed image and a reference animated image applied to the to-be-processed image are determined; then the to-be-processed image is processed according to the reference animated image, to generate a plurality of frames of processed images, each frame of the plurality of frames of processed images including the to-be-processed object; and the plurality of frames of processed images are composed into a target animated image. In this way, fun of the to-be-processed image may be increased, user experience is improved, and stickiness of a user on a social platform is enhanced.

Figure 4:
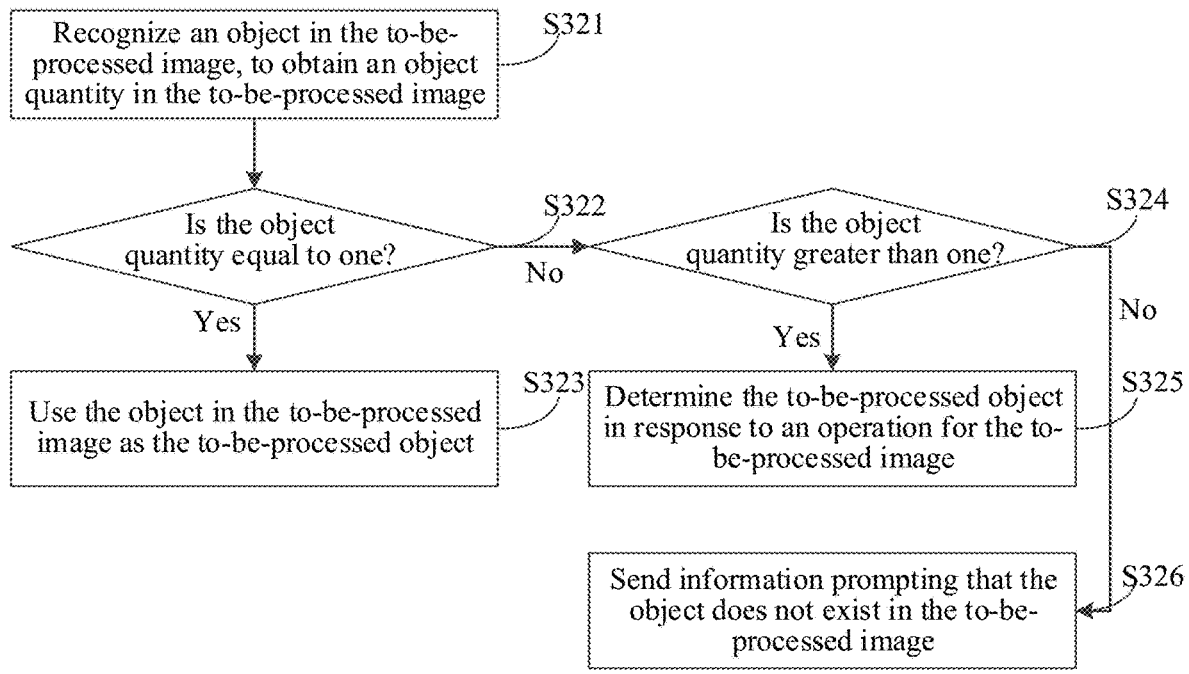
FIG. 4 is a schematic flowchart of an implementation process of step S320 shown in FIG. 3.

FIG. 4 is a schematic flowchart of an implementation process of step S320 shown in FIG. 3.

As shown in FIG. 4, in this implementation of this disclosure, step S320 may further include the following steps.

Step S321: Recognize an object in the to-be-processed image, to obtain an object quantity in the to-be-processed image.

In this embodiment of this disclosure, description is made by using an example in which the object is a face. All faces in the to-be-processed image may be detected and obtained through a facial recognition algorithm, and a quantity of faces in the to-be-processed image is accordingly determined.

Step S322: Determine whether the object quantity is equal to one; and perform step S323 in a case that the object quantity is equal to one; otherwise, perform step S324.

In this embodiment of this disclosure, whether the quantity of faces is equal to one is determined.

Step S323: Use the object in the to-be-processed image as the to-be-processed object in a case that the object quantity is equal to one.

In this embodiment of this disclosure, if the quantity of faces in the to-be-processed image is one, the face in the to-be-processed image may be directly used as a to-be-processed face.

Step S324: Continue to determine whether the object quantity is greater than one; and perform step S325 in a case that the object quantity is greater than one; otherwise, perform step S326.

In this embodiment of this disclosure, whether the quantity of faces in the to-be-processed image is greater than one may be further determined.

Step S325: Determine, in a case that the object quantity is greater than one, the to-be-processed object in response to an operation on the to-be-processed image.

In this embodiment of this disclosure, if the quantity of faces in the to-be-processed image is greater than one, prompt information may be sent to the user, to prompt the user to select at least one face from the two or more faces in the to-be-processed image as the to-be-processed face.

When the quantity of faces in the to-be-processed image is greater than one, the user is not limited to select only one face as the to-be-processed face. One or more faces in the plurality of faces in the to-be-processed image may be determined as the to-be-processed face according to user preferences. This is not limited in this disclosure. In all the following embodiments, description is made by using an example in which one face is selected as the to-be-processed face.

Step S326: Send information prompting that the object does not exist in the to-be-processed image.

In this embodiment of this disclosure, if it is detected that no face exists in the to-be-processed image, prompt information may be sent to the user, to prompt the user that no face exists in the to-be-processed image, to end this operation.

Figure 5:
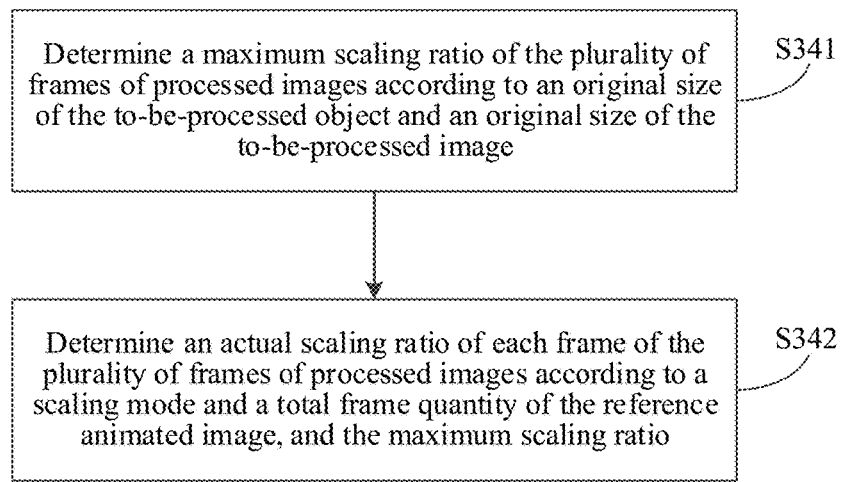
FIG. 5 is a schematic flowchart of an implementation process of step S340 shown in FIG. 3.

FIG. 5 is a schematic flowchart of an implementation process of step S340 shown in FIG. 3.

As shown in FIG. 5, step S340 provided by this implementation of this disclosure may further include the following steps.

Step S341: Determine a maximum scaling ratio of the plurality of frames of processed images according to an original size of the to-be-processed object and an original size of the to-be-processed image.

In this embodiment of this disclosure, if there is scaling processing in the reference animated image selected by the user, a total maximum scaling ratio of the plurality of frames of processed images may be determined according to an original size of the to-be-processed face and an original size of the to-be-processed image.

For example, an original size of the to-be-processed face in the to-be-processed image may be obtained through face detection. Assuming that a width and a height of the original size of the to-be-processed face are respectively denoted as (Width and fHeight, and a width and a height of the original size of the to-be-processed image are respectively denoted as pWidth and pHeight, a maximum scaling ratio scaleMax of the to-be-processed face may be calculated through the following formula:

$$\text{scaleMax} = \min(p\text{Width}/f\text{Width}, p\text{Height}/f\text{Height}) - k \tag{1}$$

In the formula (1), min is an operation of obtaining a minimum value, and k is a preset constant. For example, a default value of k may be set to 0.2, but this disclosure is not limited hereto. A background server device may dynamically adjust this constant. The choice of the value of k is related to a visual effect expected by a designer.

Step S342: Determine an actual scaling ratio of each frame of the plurality of frames of processed images according to a scaling mode and a total frame quantity of the reference animated image, and the maximum scaling ratio.

In this embodiment of this disclosure, the scaling mode may include any one of a uniform speed scaling mode, a variable speed scaling mode, and the like.

The uniform speed scaling mode indicates that scaling ratios of all frames of images in the composed target animated image are the same. The variable speed scaling mode indicates that scaling ratios of all frames of images in the composed target animated image are not completely the same. For example, the scaling ratios of all frames of images may proportionally increase or decrease.

Figure 6:
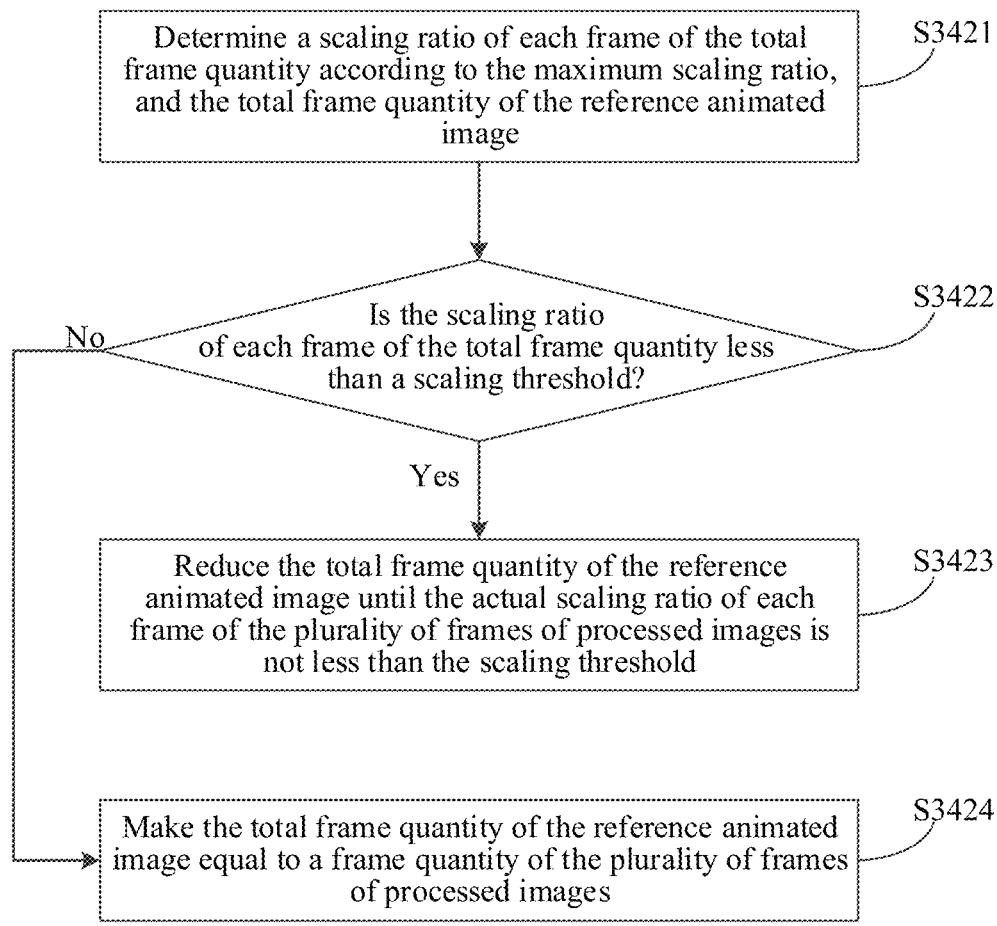
FIG. 6 is a schematic flowchart of an implementation process of step S342 shown in FIG. 5.

FIG. 6 is a schematic flowchart of an implementation process of step S342 shown in FIG. 5.

As shown in FIG. 6, description is made by using an example in which the scaling mode is the uniform speed scaling mode. Step S342 provided by this implementation of the present disclosure may further include the following steps.

Step S3421: Determine a scaling ratio of each frame of the total frame quantity according to the maximum scaling ratio, and the total frame quantity of the reference animated image.

For example, it is assumed that a preset total frame quantity in the reference animated image is M, where M is a positive integer greater than or equal to 2. In a case that the scaling mode is the uniform speed scaling mode, a scaling ratio scaleframe of each frame of the plurality of frames of processed images may be calculated through the following formula:

$$\text{scaleframe} = \text{scaleMax}/M \quad (2)$$

Step S3422: Determine whether the scaling ratio of each frame of the plurality of frames of processed images vis less than a scaling threshold s; and if the scaling ratio is less than the scaling threshold s, perform step S3423; otherwise, perform step S3424.

In this embodiment of this disclosure, whether the scaling ratio scaleframe of each frame of the total frame quantity of the reference animated image is less than the preset scaling threshold s is determined. If the scaling ratio scaleframe of each frame is less than the scaling threshold s, the frame quantity Ftotal of images in the final composed target animated image and an actual scaling ratio scaleframe' of each frame may be correspondingly adjusted. If the scaling ratio scaleframe of each frame is not less than the scaling threshold s, the total frame quantity M of the reference animated image may be directly used as the frame quantity Ftotal of images in the final composed target animated image (herein it is a situation without taking account of adding a text to the target animated image, and for details, refer to the following description).

In this embodiment of this disclosure, a default value of s may be set to 1.1, but this disclosure is not limited thereto. The choice of the value of s may be related to a visual effect expected by a designer.

Step S3423: Reduce, in a case that the scaling ratio of each frame of the plurality of frames of processed images is less than the scaling threshold s, the total frame quantity of the reference animated image until the actual scaling ratio of each frame of the plurality of frames of processed images is not less than the scaling threshold s.

Step S3424: Make the total frame quantity of the reference animated image equal to frames in the plurality of frames of processed images in a case that the scaling ratio of each frame of the total frame quantity of the reference animated image is not less than the scaling threshold s.

In this embodiment of this disclosure, the scaling ratio scaleframe of each frame is first calculated according to the total frame quantity M of the reference animated image. If the scaling ratio scaleframe of each frame is less than the scaling threshold s, the total frame quantity M is reduced until the actual scaling ratio scaleframe' of each frame is not less than the scaling threshold s. The frame quantity after the reduction in this case is a frame quantity of the final face animated image, and is denoted as Ftotal; otherwise the frame quantity of the face animated image is equal to the total frame quantity M of the reference animated image.

In the uniform speed scaling mode, the actual scaling ratios scaleframe' of all the frames in the target animated image are the same. In the variable speed scaling mode, the actual scaling ratios scaleframe' of all the frames in the target animated image may be different. The actual scaling ratio scaleframe' of each frame of image may use the same scaling ratio scaleframe of the reference animated image. In this case, the actual scaling ratio scaleframe' of each frame may not be limited by the scaling threshold s. However, regardless of which scaling mode is in, a sum of all actual scaling ratios scaleframe' of all the frames in the target animated image may not be greater than the maximum scaling ratio scaleMax.

Figure 7:
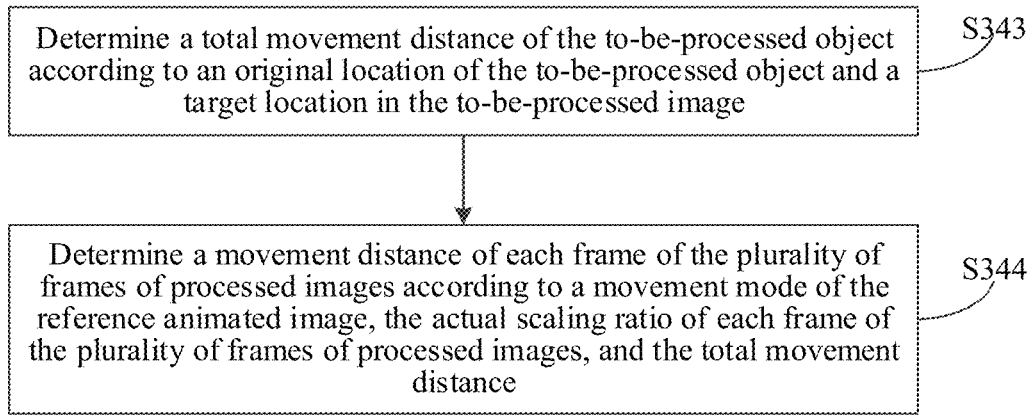
FIG. 7 is a schematic flowchart of another implementation process of step S340 shown in FIG. 3.

FIG. 7 is a schematic flowchart of another implementation process of step S340 shown in FIG. 3.

As shown in FIG. 7, step S340 provided by this implementation of this disclosure may further include the following steps.

Step S343: Determine a total movement distance of the to-be-processed object according to an original position and a target position of the to-be-processed object in the to-be-processed image.

In this embodiment of this disclosure, an original position of the to-be-processed object in the to-be-processed image may be determined through a facial recognition algorithm. Herein, a center position (x1, y1) of the to-be-processed face is used as the original position of the to-be-processed object, but this disclosure is not limited hereto.

In this embodiment of this disclosure, the target position in the to-be-processed image may be determined according to configuration information of the reference animated image. In the following embodiment, description is made by using an example in which the target position is a center position (x2, y2) of the to-be-processed image. That is, the to-be-processed face is finally moved to the center position of the image through movements frame by frame. However, this disclosure is not limited thereto. The specific target position may be configured according to an actually expected visual effect.

A total movement distance Dtotal of the to-be-processed object may be determined through the following formula:

$$D\text{total} = \sqrt{(x1-x2)^2 + (y1-y2)^2} \quad (3)$$

Step S344: Determine a movement distance of each frame of the plurality of frames of processed images according to a movement mode of the reference animated image, the actual scaling ratio of each frame of the plurality of frames of processed images, and the total movement distance.

In an exemplary embodiment, the movement mode may include any one or more of a rectilinear uniform speed movement mode, a rectilinear variable speed movement mode, a curvilinear uniform speed movement mode, a curvilinear variable speed movement mode, and the like.

The rectilinear uniform speed movement mode indicates that the to-be-processed face of each frame of image in the target animated image moves towards an image center according to a rectilinear track, and movement distances of all frames of images are the same. The rectilinear variable speed movement mode indicates that the to-be-processed face of each frame of image in the target animated image moves towards the image center according to a rectilinear track, and movement distances of all frames of images are not completely the same. For example, the movement distances may increase or decrease frame by frame. The curvilinear uniform speed movement mode indicates that the to-be-processed face of each frame of image in the target animated image moves towards the image center according to a curvilinear track, and movement distances of all frames of images are the same. The curvilinear track may be, for example, any one of suitable shapes such as a wave shape, a semicircle shape, and a fan shape. The curvilinear variable speed movement mode indicates that the to-be-processed face of each frame of image in the target animated image moves towards the image center according to a curvilinear track, and movement distances of all frames of images are not completely the same.

Description is made by using an example in which the movement mode is the rectilinear uniform speed movement mode. When the actual scaling ratio of each frame is not taken into consideration, a movement distance dframe of each frame in the plurality of frames of processed images may be calculated and obtained through the following formula:

$$d\text{frame} = D\text{total}/F\text{total} \tag{4}$$

In an actual situation, if the reference animated image performs a scaling operation on each frame of image, when the movement distance of each frame of image is calculated, the actual scaling ratio of each frame further needs to be considered, and the movement distance thereof needs to be properly adjusted.

Figure 8:
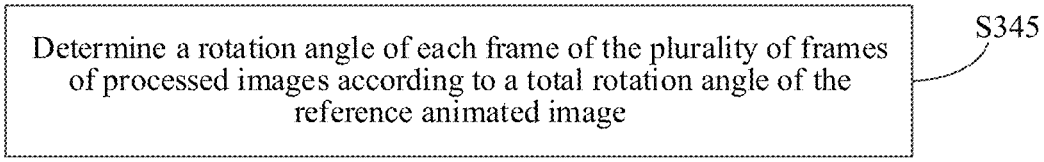
FIG. 8 is a schematic flowchart of still another implementation process of step S340 shown in FIG. 3.

FIG. 8 is a schematic flowchart of still another implementation process of step S340 shown in FIG. 3.

As shown in FIG. 8, step S340 provided by this implementation of this disclosure may further include the following steps.

Step S345: Determine a rotation angle denoted by angrot, of each frame of the plurality of frames of processed images according to a total rotation angle denoted by Rtotal, of the reference animated image.

In this embodiment of this disclosure, if a rotation mode is set in the reference animated image, for example, the rotation mode may include any one of a uniform speed rotation mode and a variable speed rotation mode. The uniform speed rotation mode indicates that the rotation angles of all frames of images in the target animated image are the same. The variable speed rotation mode indicates that the rotation angles of all frames of images in the target animated image are not completely the same. For example, the rotation angles increase or decrease proportionally frame by frame.

Herein, using an example in which the rotation mode is the uniform speed rotation mode, a rotation angle angrot of each frame of image may be calculated and obtained through the following formula:

$$\text{angrot} = R\text{total}/F\text{total} \tag{5}$$

The reference animated image may be set to include one of the scaling mode, the movement mode, the rotation mode, or the like, or include any combination thereof.

Specifically, all the foregoing embodiments are descriptions in a case that the target animated image does not include an image adapted with a text.

Figure 9:
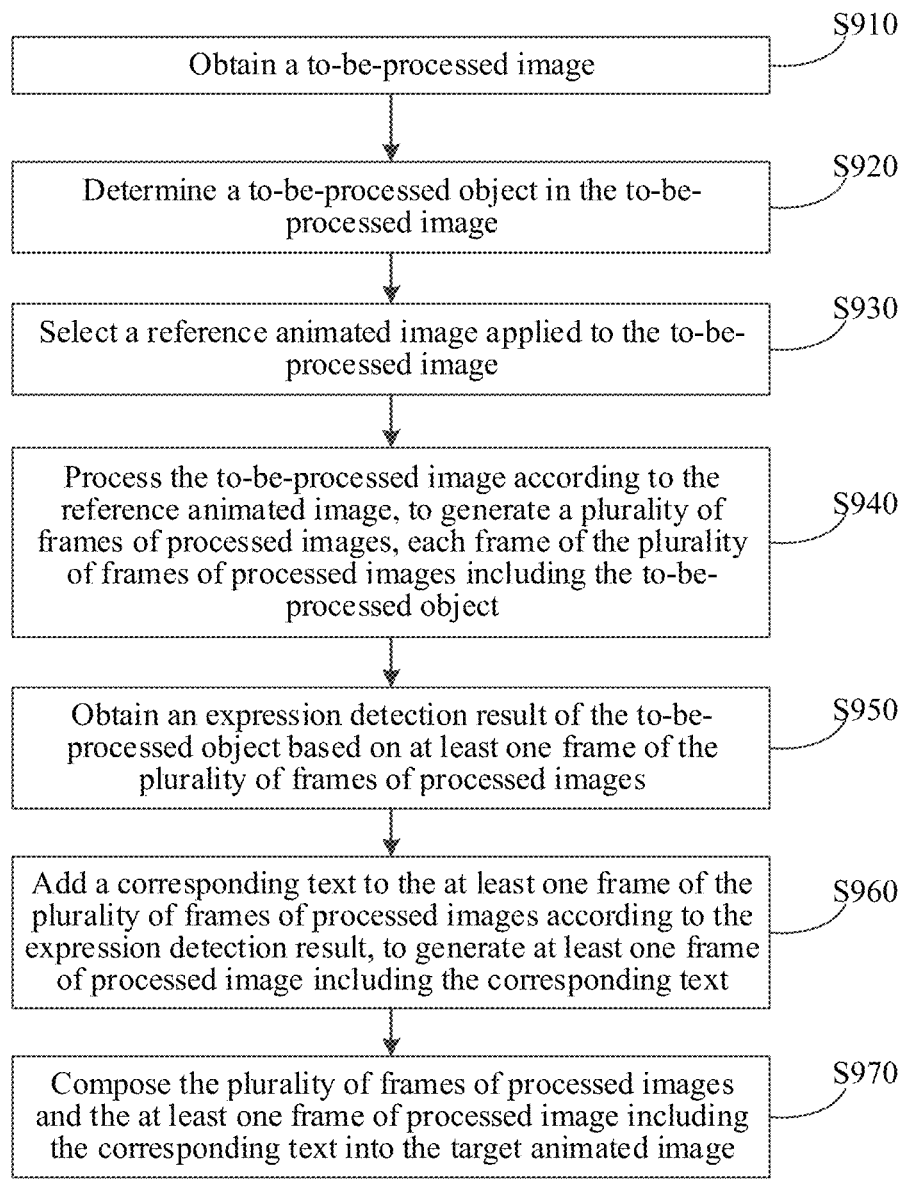
FIG. 9 is a schematic flowchart of an image processing method according to another embodiment of this disclosure.

FIG. 9 is a schematic flowchart of an image processing method according to another embodiment of this disclosure.

As shown in FIG. 9, the image processing method provided by this implementation of this disclosure may include the following steps:

Step S910: Obtain a to-be-processed image.

Step S920: Determine a to-be-processed object in the to-be-processed image, the to-be-processed object including at least one of a human face, an animal face, or a cartoon character face.

Step S930: Select a reference animated image applied to the to-be-processed image.

Step S940: Process the to-be-processed image according to the reference animated image, to generate a plurality of frames of processed images, each frame of the plurality of frames of processed images including the to-be-processed object.

For steps S910 to S940, refer to steps S310 to S340 in the embodiment shown in FIG. 3, and details are not described herein again.

Step S950: Obtain an expression detection result of the to-be-processed object based on at least one frame of the plurality of frames of processed images.

In this embodiment of this disclosure, expression recognition may be performed on the to-be-processed face based on a last frame, that is, an $F\text{total}^{th}$ frame, in the plurality of frames of processed images, to obtain an expression detection result. However, this disclosure is not limited hereto. Expression recognition may be performed according to the to-be-processed image or any one or more frames of the plurality of frames of processed images. In this way, the expression detection result of the to-be-processed face may be further obtained, to obtain a matching text.

In an exemplary embodiment, the selecting a reference animated image applied to the to-be-processed image may include: determining, in response to an operation on the reference animated image, the reference animated image applied to the to-be-processed image; or recommending, according to the expression detection result, the reference animated image applied to the to-be-processed image.

For example, one or more target templates may be selected as the reference animated image according to a selection operation of the user.

In another example, if the system recognizes that an expression of the to-be-processed face is a big smile, an animated image template expressing a happy mood is automatically matched as the reference animated image; or if the system recognizes that the to-be-processed face is a crying expression, an animated image template expressing a very bad mood may be automatically matched as the reference animated image.

Step S960: Add a corresponding text to the at least one frame of the plurality of frames of processed images according to the expression detection result, to generate at least one frame (assumed to be L frames, where L is a positive integer) of processed image including the corresponding text.

In this embodiment of this disclosure, the system may automatically adapt a corresponding text according to the detected expression of the to-be-processed face. For example, if the expression of the to-be-processed face is recognized to be unhappy, possibly adapted texts are: Feel unhappy and want to cry. Certainly, in another embodiment, alternatively, the user may manually input a text to be added to the image.

In this embodiment of this disclosure, the adapted corresponding text may be added to the last frame, that is, the $Ftotal^{th}$ frame, in the plurality of frames of processed images. However, this disclosure is not limited thereto. The frame or frames to which the text is added may be set according to the reference animated image or set by the user, for example, by matching with the frame of image in the reference animated image containing text annotation.

Step S970: Compose the plurality of frames of processed images and the at least one frame of processed image including the corresponding text into the target animated image.

In this embodiment of this disclosure, the Ftotal frames of processed images and L frames of images that are generated in step S940 and step S960 are composed into one target animated image, such as GIF. The final target animated image may include Ftotal+L frames.

In an exemplary embodiment, there is at least one reference animated image.

In an exemplary embodiment, the processing the to-be-processed image according to the reference animated image, to generate a plurality of frames of processed images may include: separately processing, in a case that there are a plurality of reference animated images, the to-be-processed image according to the plurality of reference animated images, to separately generate the plurality of frames of processed images. The composing the plurality of frames of processed images into a target animated image may include: separately composing the plurality of frames of processed images generated according to the reference animated images into the target animated image; and sequentially splicing the target animated images composed according to the reference animated images. In this way, corresponding processing may be separately performed on the to-be-processed face according to the plurality of reference animated images, and corresponding target animated images are separately composed. Finally, the target animated images are sequentially spliced, to form a longer target animated image, which may further increase fun of the target animated image.

In an exemplary embodiment, the method may further include: publishing the generated target animated image to a selected social network platform in response to a selection operation.

For example, the user may select to publish the target animated image generated in S970 to Qzone, or WeChat, or the like to share with friends.

In an exemplary embodiment, the method may further include: previewing the composed target animated image after the target animated image is composed.

In an exemplary embodiment, the method may further include: storing the target animated image to a specified directory of a terminal device and/or a server device in response to a storage selection operation of the user, and prompting the user to jump to a publishing page of a corresponding social network platform.

To adapt the corresponding text to the image, it is not limited to use expression recognition as described above. Any other suitable manner may be alternatively used to add the corresponding text, for example, the text may be based on the shooting time and location of the image.

Figure 10:
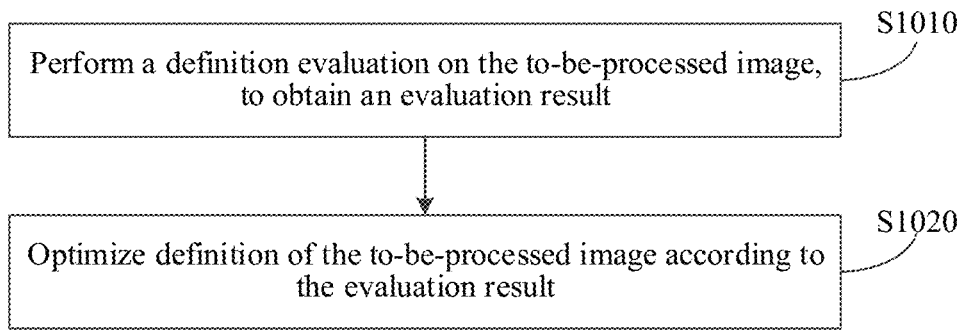
FIG. 10 is a schematic flowchart of an image processing method according to still another embodiment of this disclosure.

FIG. 10 is a schematic flowchart of an image processing method according to still another embodiment of this disclosure.

As shown in FIG. 10, the image processing method provided by this implementation of this disclosure may include the following steps compared with the embodiments shown in FIG. 3 and FIG. 9.

Step S1010: Perform a definition evaluation on the to-be-processed image, to obtain an evaluation result.

In an exemplary embodiment, the performing a definition evaluation on the to-be-processed image may include: performing the definition evaluation on the to-be-processed image by using a quality evaluation algorithm without using a reference picture.

In a quality evaluation without a reference picture, definition of an image is an important index for measuring image quality. The definition may well correspond to a subjective perception of a person, and low image definition indicates blur of the image. For a quality evaluation application without a reference picture, the evaluation may be performed by selecting a suitable algorithm according to a situation of the to-be-processed image.

For example, any one of a Brenner gradient function, a Tenengrad gradient function, a Laplacian gradient function, a gradation variance product function, a variance function, an energy gradient function, a Vollath function, and the like may be used.

Step S1020: Optimize definition of the to-be-processed image according to the evaluation result.

In an exemplary embodiment, the optimizing definition of the to-be-processed image according to the evaluation result may include: optimizing the definition of the to-be-processed image by using a super-resolution technology based on deep learning.

The super-resolution technology based on deep learning may transform a low-resolution image into a high-resolution image by using deep learning. The effect of the deep learning based super-resolution technology may be equal to, or even better than that of the current super-resolution solution, and at the same time, the speed approximately increases ten to one hundred times. In addition, the super-resolution technology does not require high performance hardware and can be run on a common mobile device. Moreover, aliasing artifacts may be avoided. In this embodiment of this disclosure, a super-resolution technology based on deep learning is selected to optimize the definition of the image, to ensure that definition of each frame in the target animated image is relatively high.

In another embodiment, another manner may be alternatively used to perform definition optimization. For example, a technology of reconstructing a low-resolution image into an image of a greater size, more pixels, and higher image quality through an upsampling scheme may be used. For example, the upsampling scheme may be a linear method which performs simple and fixed combination on known pixel values, to add a new pixel value. Because a fixed linear filter (one constant convolution kernel performs indiscriminate processing on the entire image) is used, the speed of the method is high.

In this embodiment of this disclosure, definition optimization may be performed only on the to-be-processed image. However, in another embodiment, alternatively, all the frames in the target animated image may be first obtained, and then definition optimization may be separately performed on each frame of image.

Figure 11:
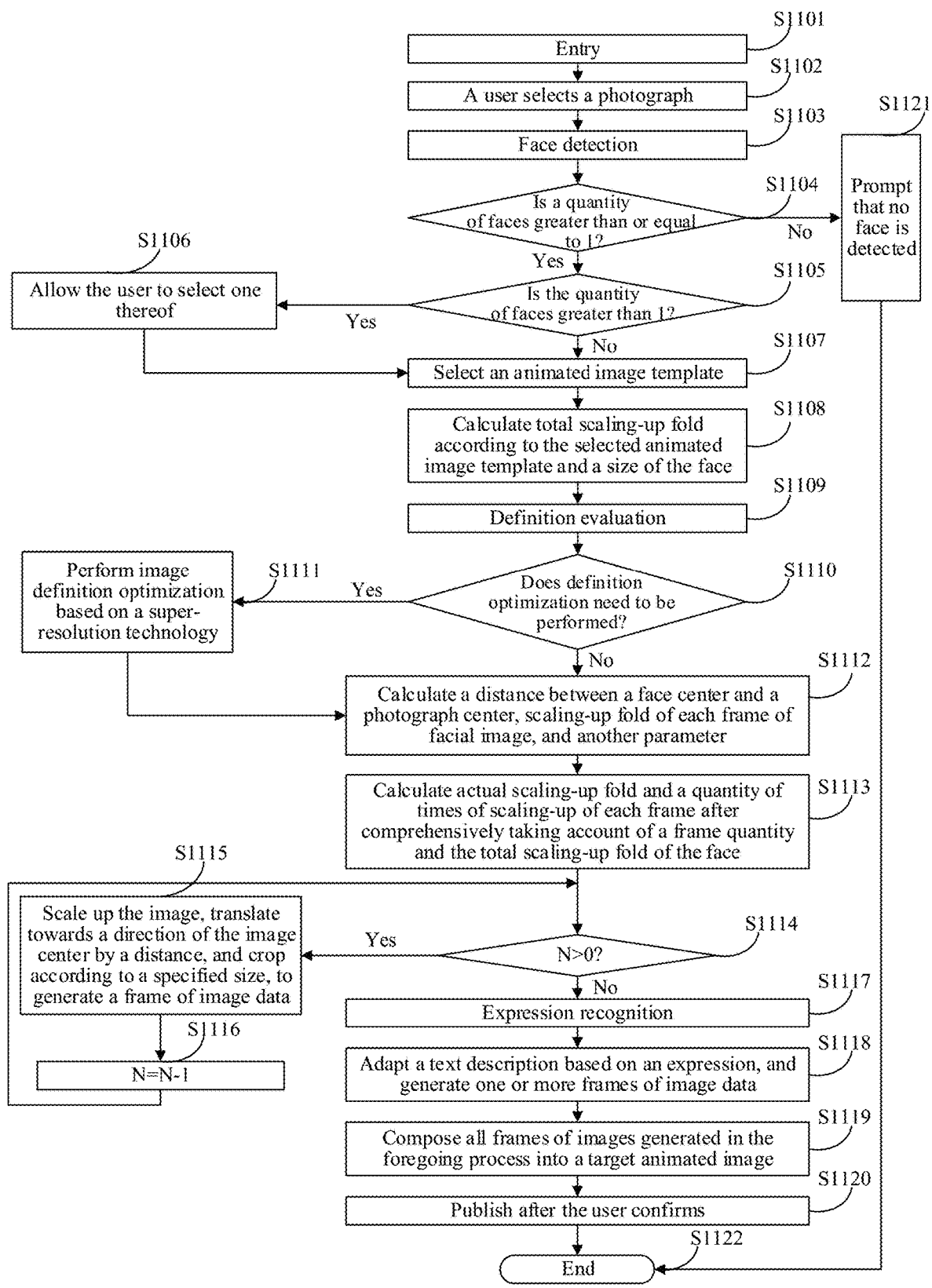
FIG. 11 is a schematic flowchart of an image processing method according to yet another embodiment of this disclosure.

FIG. 11 is a schematic flowchart of an image processing method according to yet another embodiment of this disclosure. The specific process of the image processing method provided by the foregoing embodiments is described by using an example of a default animated image template herein, where the default animated image template may be that the face moves towards the image center in a uniform speed along a rectilinear track, and is scaled up frame by frame in a uniform speed without another special effect such as rotation.

As shown in FIG. 11, the image processing method provided by this implementation of this disclosure may include the following steps:

Step S1101: Entry

Step S1102: A user selects a photograph.

In this embodiment of this disclosure, to generate a fun target animated image by using a face photograph, a photograph list may be entered through a "fun animated face image" entry, and a photograph is selected.

Step S1103: Face detection.

In this embodiment of this disclosure, after the selected photograph is determined, a system automatically recognize a size, a position, and a quantity of the face in the selected photograph.

Specifically, any facial recognition algorithm, such as a recognition algorithm based on face feature points, a recognition algorithm based on an entire face image, a recognition algorithm based on a template, or an algorithm performing recognition by using a neural network, may be used to perform face detection.

As the first step of facial recognition, face detection is responsible for detecting a face from an image background. Detection is to determine whether there is a face in an image, and location is to provide a position of the face in the image. Face image information obtained after the location is in the measurement space. To perform recognition, data in the measurement space needs to be first mapped to a feature space. For example, a principal component analysis method may be used, and a principle thereof is to project high-dimensional vector into a low-dimensional vector space through a special feature vector matrix, and characterize the high-dimensional vector as a low-dimensional vector, in which only some secondary information is lost. A dimension quantity of an image may be reduced by performing a feature extraction operation on a detected and located face image, thereby reducing the calculation amount of recognition, and improving recognition precision.

Step S1104: Determine whether a quantity of faces detected in the photograph is greater than or equal to 1; and perform step S1105 in a case that the quantity of faces detected in the photograph is greater than or equal to 1; or perform step S1121 in a case that the quantity of faces detected in the photograph is less than 1.

Step S1105: Continue to determine whether the quantity of faces detected in the photograph is greater than 1; and perform step S1106 in a case that the quantity of faces detected in the photograph is greater than 1; or perform step S1107 in a case that the quantity of faces detected in the photograph is equal to 1.

Step S1106: Allow the user to select one thereof.

In this embodiment of this disclosure, if a plurality of faces are detected in the selected photograph, the user may be allowed to select a face intended to be used for generating a target animated image as a to-be-processed face. In one embodiment, the user may choose more than one faces.

Step S1107: Select an animated image template as a reference animated image.

In this embodiment of this disclosure, the user may be allowed to select an animated image template as the reference animated image. The reference animated image affects the composed target animated image in aspects such as the scaling-up ratio of each frame of face, whether a uniform speed movement is performed, a movement track (rectilinear or curvilinear) towards an image center, and a rotation angle (being 0 indicates no rotation, and being 360 indicates rotate 360 degrees in total from beginning frame to end frame of the target animated image).

For example, a final target animated image effect may be: that the face is gradually scaled up, and a face center moves towards the image center in a uniform speed along a straight line; or that the face center may move towards the image center along a curved line in variable speeds, or that the image is rotated while moving towards the image center.

Step S1108: Calculate total scaling-up ratio according to the selected animated image template and a size of the face.

Step S1109: Definition evaluation.

Step S1110: Determine whether definition optimization needs to be performed; and perform step S1111 in a case that the definition optimization needs to be performed; or perform step S1112 in a case that the definition optimization does not need to be performed.

Step S1111: Perform image definition optimization based on a super-resolution technology.

Step S1112: Calculate a distance between a face center and a photograph center, scaling-up ratio of each frame of face image, and other parameters.

In this embodiment of this disclosure, a ratio by which each frame of the target animated image needs to be scaled up and scaled down, a movement distance of each frame when moving towards an image center point, and a rotation angle may be calculated according to an original size and an original position of the to-be-processed face, and an original size of the selected to-be-processed image. For example, a track of moving towards the image center point may be a straight line or a curved line. Different movement tracks may implement different fun effects. The movement track and the rotation angle are related to the selected reference animated image.

Step S1113: Calculate actual scaling-up ratio and a quantity N of total times of scaling-up after comprehensively taking account of a frame quantity and the total scaling-up fold of the face, N being an integer greater than or equal to 0.

Step S1114: Determine whether N is greater than 0; and perform step S1115 in a case that N is greater than 0; or perform step S1117 in a case that N is equal to 0.

Step S1115: Scale up the image, translate towards a direction of the image center by a distance, and crop according to a specified size, to generate a frame of image data.

In this embodiment of this disclosure, the cropping according to a specified size indicates a limitation on the size of the target animated image. For example, a default policy is that a long side of the target animated image is not greater than 960 pixels. However, this disclosure is not limited thereto, and a configuration may be delivered for dynamic adjustment.

Step S1116: Set N=N−1, and repeat steps S1114 to S1116 until N is 0.

Step S1117: Expression recognition.

Step S1118: Adapt a text description based on an expression, and generate one or more frames of image data.

Step S1119: Compose all frames of images generated in the foregoing process into a target animated image.

Step S1120: The user confirms the target animated image and publishes the target animated image, and performs step S1122 to end this operation.

Step S1121: Prompt that no face is detected, and then perform step S1122.

Step S1122: End.

Through the image processing method provided by this implementation of this disclosure, a photograph including a face is used, and a target animated image is generated by gradually adjusting a position, a size, and a rotation angle of the face, and a paragraph of matching texts are further added based on expression detection on the face, to further improve fun of the target animated image.

Figure 12:
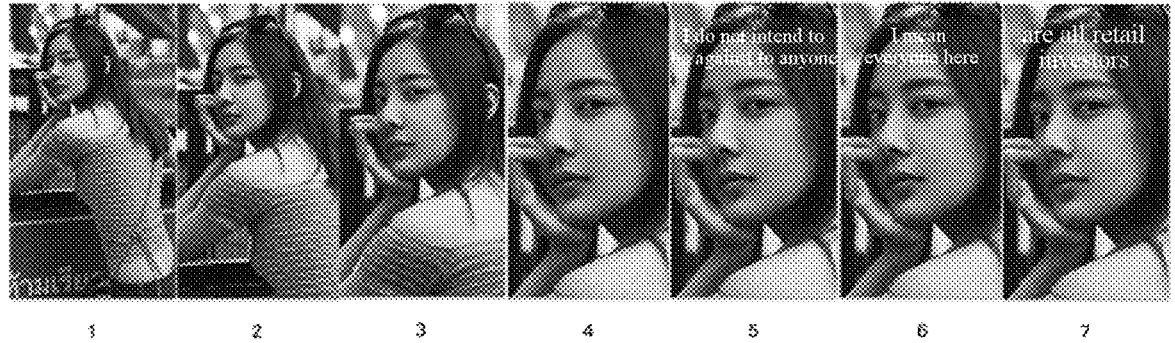
FIG. 12 is a schematic diagram of a display effect of an image processing method according to an embodiment of this disclosure.

By using the image processing method of the embodiment shown in FIG. 11, an effect of each frame in the final composed target animated image is shown in FIG. 12.

Ftotal is equal to 4. That is, in the first 4 frames of images, the face is scaled up frame by frame, a face center is gradually translated to an image center, and cropping of a specified size is performed on the images, so that sizes of all the frames are the same. L is equal to 3. That is, 3 sentences are added according to the expression detection on the face: "I do not intend to be against to anyone" is added to the fifth image, "I mean everyone here" is added to the sixth image, and "are all retail investors" is added to the seventh image.

In the embodiment shown in FIG. 12, L lines of texts are added to L frames of images one by one. However, in another embodiment, the L lines of texts may alternatively be added to one frame of image. This is not limited in this disclosure.

The following describes apparatus embodiments of this disclosure, and the apparatus embodiments can be used for performing the image processing method of this disclosure. For details not disclosed in the apparatus embodiments of this disclosure, refer to the foregoing embodiment of the image processing method of this disclosure.

Figure 13:
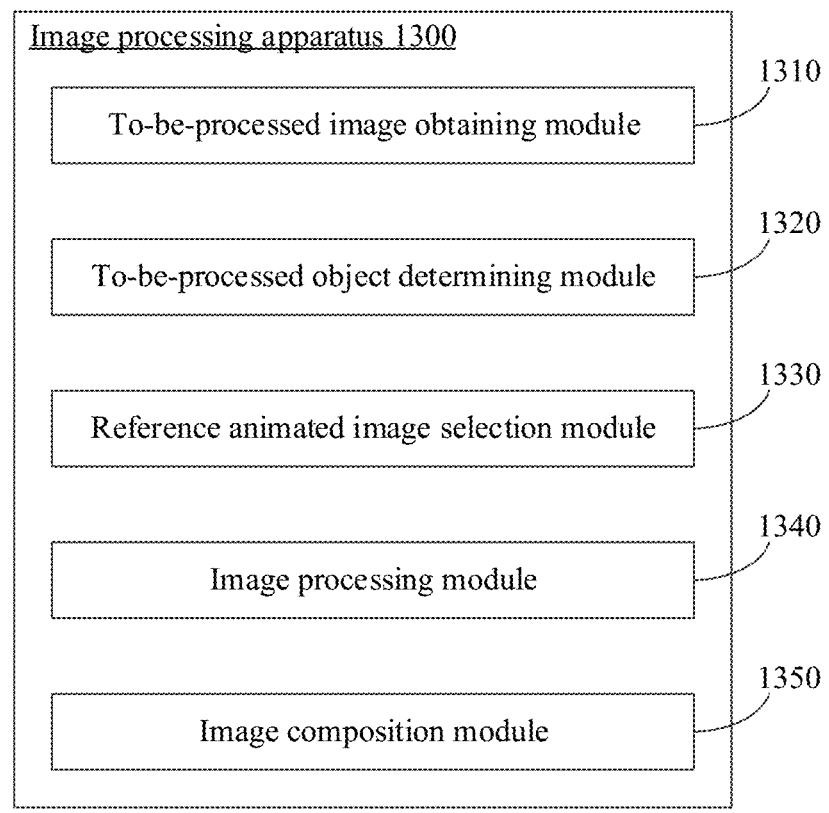
FIG. 13 is a schematic block diagram of an image processing apparatus according to another embodiment of this disclosure.

FIG. 13 is a schematic block diagram of an image processing apparatus according to another embodiment of this disclosure.

As shown in FIG. 13, the image processing apparatus 1300 provided by this implementation of this disclosure may include a to-be-processed image obtaining module 1310, a to-be-processed object determining module 1320, a reference animated image selection module 1330, an image processing module 1340, and an image composition module 1350.

The to-be-processed image obtaining module 1310 may be configured to obtain a to-be-processed image.

In an exemplary embodiment, the to-be-processed image obtaining module 1310 may further include a to-be-processed image obtaining unit. The to-be-processed image obtaining unit may be configured to determine the to-be-processed image in response to an operation for an image list.

The to-be-processed object determining module 1320 may be configured to determine a to-be-processed object in the to-be-processed image, the to-be-processed object including at least one of a human face, an animal face, or a cartoon character face.

In an exemplary embodiment, the to-be-processed object determining module 1320 may further include an object recognition unit, a first to-be-processed object determining unit, and a second to-be-processed object determining unit. The object recognition unit may be configured to recognize an object in the to-be-processed image, to obtain an object quantity in the to-be-processed image. The first to-be-processed object determining unit may be configured to use the object in the to-be-processed image as the to-be-processed object in a case that the object quantity is equal to one. The second to-be-processed object determining unit may be configured to determine, in a case that the object quantity is greater than one, the to-be-processed object in response to an operation for the to-be-processed image.

The reference animated image selection module 1330 may be configured to select a reference animated image applied to the to-be-processed image.

The image processing module 1340 may be configured to process the to-be-processed image according to the reference animated image, to generate a plurality of frames of processed images, each frame of the plurality of frames of processed images including the to-be-processed object.

The image composition module 1350 may be configured to compose the plurality of frames of processed images into a target animated image.

In an exemplary embodiment, the image processing apparatus 1300 may further include a definition evaluation module and a definition optimization module.

The definition evaluation module may be configured to perform a definition evaluation on the to-be-processed image, to obtain an evaluation result. The definition optimization module may be configured to optimize definition of the to-be-processed image according to the evaluation result.

In an exemplary embodiment, the definition evaluation module may further include a definition evaluation unit. The definition evaluation unit may be configured to perform the definition evaluation on the to-be-processed image by using a quality evaluation algorithm without using a reference picture.

In an exemplary embodiment, the definition optimization module may further include a definition optimization unit. The definition optimization unit may be configured to optimize the definition of the to-be-processed image by using a super-resolution method based on deep learning.

Figure 14:
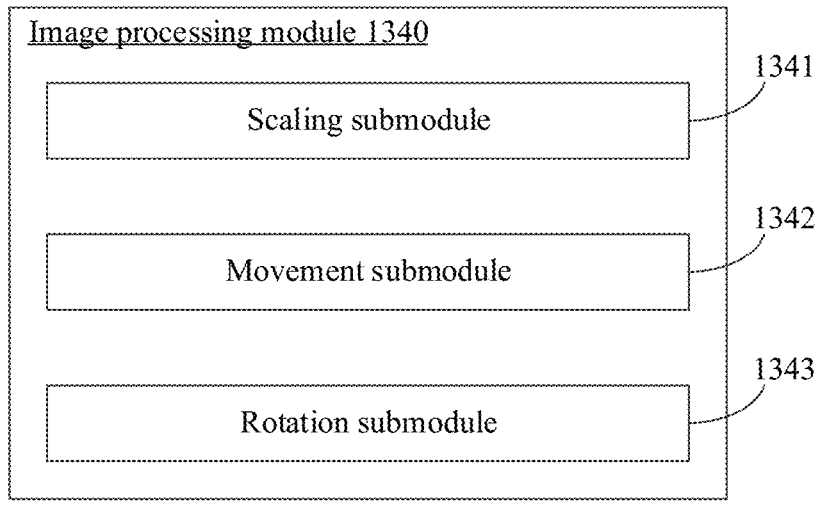
FIG. 14 is a schematic block diagram of an embodiment of an image processing module 1340 shown in FIG. 13.

FIG. 14 is a schematic block diagram of an embodiment of the image processing module 1340 shown in FIG. 13.

As shown in FIG. 14, the image processing module 1340 in the embodiment shown in FIG. 13 may further include a scaling submodule 1341.

The scaling submodule 1341 may further include a maximum scaling ratio determining unit and an actual scaling ratio determining unit. The maximum scaling ratio determining unit may be configured to determine a maximum scaling ratio of the plurality of frames of processed images according to an original size of the to-be-processed object and an original size of the to-be-processed image. The actual scaling ratio determining unit may be configured to determine an actual scaling ratio of each frame of the plurality of frames of processed images according to a scaling mode and a total frame quantity of the reference animated image, and the maximum scaling ratio.

In an exemplary embodiment, the scaling mode may be a uniform speed scaling mode.

In an exemplary embodiment, the actual scaling ratio determining unit may further include a template frame scaling ratio determining subunit and a dynamic frame scaling ratio determining subunit.

The template frame scaling ratio determining subunit may be configured to determine a scaling ratio of each frame of the total frame quantity according to the maximum scaling ratio, and the total frame quantity of the reference animated image. The dynamic frame scaling ratio determining subunit may be configured to reduce, in a case that the scaling ratio of each frame of the total frame quantity is less than a scaling threshold, the total frame quantity until the actual scaling ratio of each frame of the plurality of frames of processed images is not less than the scaling threshold.

Still referring to FIG. 14, the image processing module 1340 in the embodiment shown in FIG. 13 may further include a movement submodule 1342.

The movement submodule 1342 may further include a total movement distance determining unit and a frame movement distance determining unit.

The total movement distance determining unit may be configured to determine a total movement distance of the to-be-processed object according to an original position and a target position of the to-be-processed object in the to-be-processed image. The frame movement distance determining unit may be configured to determine a movement distance of each frame of the plurality of frames of processed images according to a movement mode of the reference animated image, the actual scaling ratio of each frame of the plurality of frames of processed images, and the total movement distance.

In an exemplary embodiment, the movement mode includes any combination of a rectilinear uniform speed movement mode, a rectilinear variable speed movement mode, a curvilinear uniform speed movement mode, and a curvilinear variable speed movement mode.

In the embodiment shown in FIG. 14, the image processing module 1340 in the embodiment shown in FIG. 13 may further include a rotation submodule 1343.

The rotation submodule 1343 may be configured to determine a rotation angle of each frame of the plurality of frames of processed images according to a total rotation angle of the reference animated image.

Figure 15:
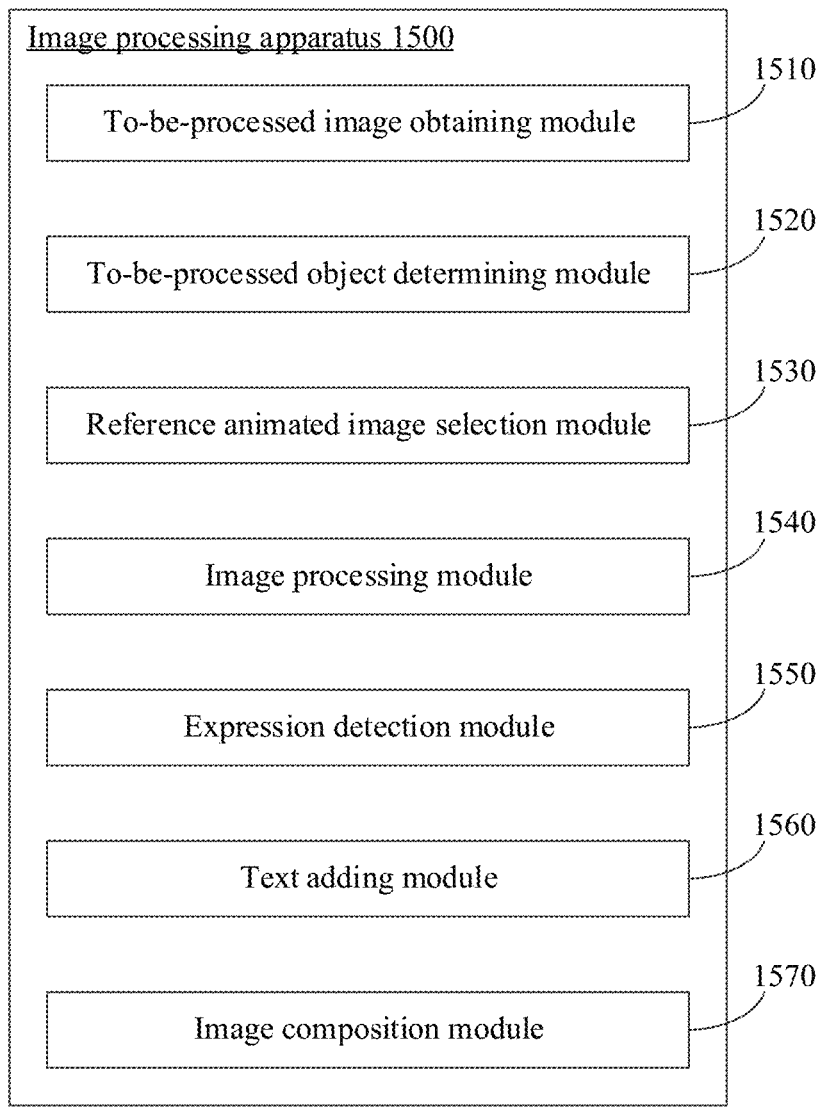
FIG. 15 is a schematic block diagram of an image processing apparatus according to another embodiment of this disclosure.

FIG. 15 is a schematic block diagram of an image processing apparatus according to another embodiment of this disclosure.

As shown in FIG. 15, the image processing apparatus 1500 provided by this implementation of this disclosure may include a to-be-processed image obtaining module 1510, a to-be-processed object determining module 1520, a reference animated image selection module 1530, an image processing module 1540, an expression detection module 1550, a text adding module 1560, and an image composition module 1570.

The to-be-processed image obtaining module 1510 may be configured to obtain a to-be-processed image.

The to-be-processed object determining module 1520 may be configured to determine a to-be-processed object in the to-be-processed image.

The reference animated image selection module 1530 may be configured to determine a reference animated image applied to the to-be-processed image.

The image processing module 1540 may be configured to process the to-be-processed image according to the reference animated image, to generate a plurality of frames of processed images, each frame of the plurality of frames of processed images including the to-be-processed object.

The expression detection module 1550 may be configured to obtain an expression detection result of the to-be-processed object based on at least one frame of the plurality of frames of processed images.

In an exemplary embodiment, the reference animated image selection module 1530 may further include: a reference animated image selection unit, and the reference animated image selection unit may be configured to determine, in response to an operation for the reference animated image, the reference animated image applied to the to-be-processed image; or a reference animated image recommendation unit, and the reference animated image recommendation unit may be configured to recommend, according to the expression detection result, the reference animated image applied to the to-be-processed image.

The text adding module 1560 may be configured to add a corresponding text to the at least one frame of the plurality of frames of processed images according to the expression detection result, to generate at least one frame of processed image including the corresponding text.

The image composition module 1570 may be configured to compose the plurality of frames of processed images and the at least one frame of processed image including the corresponding text into the target animated image.

In an exemplary embodiment, there is at least one reference animated image.

In an exemplary embodiment, the image processing module 1540 may be configured to separately process, in a case that there are a plurality of reference animated images, the to-be-processed image according to the plurality of reference animated images, to separately generate the plurality of frames of processed images. The image composition module 1570 may further include: an image composition unit, and the image composition unit may be configured to separately compose the plurality of frames of processed images generated according to the reference animated images to obtain a target animated image; and a target animated image splicing unit, and the target animated image splicing unit may be configured to sequentially splice the target animated images composed according to the reference animated images.

Although a plurality of modules or submodules or units or subunits of a device configured to perform actions are discussed in the foregoing detailed description, such division is not mandatory. In fact, according to the embodiments of this disclosure, features and functions of two or more modules or submodules or units or subunits described above may be specified in one module or submodule or unit or subunit. Conversely, the features or functions of one module or submodule or unit or subunit described above may further be divided and embodied by a plurality of modules or submodules or units or subunits.

Through descriptions of the foregoing embodiments, it is easy for a person skilled in the art to understand that the exemplary embodiments described herein can be implemented by software or by combining software with necessary hardware. Therefore, the technical solutions of the embodiments of this disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server device, a touch terminal, a network device, or the like) to perform the methods according to the embodiments of this disclosure.

After considering the specification and practicing this disclosure disclosed herein, a person skilled in the art would easily conceive of other implementations of this disclosure. This disclosure is intended to cover any variation, use, or adaptive change of this disclosure. These variations, uses, or adaptive changes follow the general principles of this disclosure and include common general knowledge or common technical means in the art that are not disclosed in this disclosure. The specification and the embodiments are considered as merely exemplary, and the real scope and spirit of this disclosure are pointed out in the following claims.

It is to be understood that this disclosure is not limited to the precise structures described above and shown in the accompanying drawings, and various modifications and changes can be made without departing from the scope of this disclosure. The scope of this disclosure is subject only to the appended claims.

What is claimed is:

1. A method for image processing, performed by an electronic device, comprising:
 obtaining a to-be-processed image;
 determining a to-be-processed object in the to-be-processed image, the to-be-processed object comprising at least one of a human face, an animal face, or a cartoon character face;
 selecting a reference animated image to be applied to the to-be-processed image;
 determining a maximum scaling ratio of a plurality of frames of images according to an original size of the to-be-processed object and an original size of the to-be-processed image;
 determining an actual scaling ratio of each frame of the plurality of frames of images according to a scaling mode and a total frame quantity of the reference animated image, and the maximum scaling ratio;
 generating the plurality of frames of images based on the to-be-processed image and the actual scaling ratio of each frame of the plurality of frames of images, each frame of the plurality of frames of images comprising the to-be-processed object; and
 composing the plurality of frames of images into a target animated image.

2. The method according to claim 1, wherein the scaling mode is a uniform speed scaling mode; and wherein determining the actual scaling ratio of each frame of the plurality of frames of images according to the scaling mode and the total frame quantity of the reference animated image, and the maximum scaling ratio comprises:
 determining a first scaling ratio of each frame of the plurality of frames of images according to the maximum scaling ratio, and the total frame quantity;
 decrementing the total frame quantity, when the first scaling ratio of each frame of the plurality of frames of images is less than a scaling threshold to obtain an updated total frame quantity, and determining the first scaling ratio according to the maximum scaling ratio, and the updated total frame quantity, until the first scaling ratio of each frame of the plurality of frames of images is not less than the scaling threshold; and
 setting the actual scaling ratio to the first scaling ratio.

3. The method according to claim 1, wherein generating the plurality of frames of images based on the to-be-processed image and the actual scaling ratio of each frame of the plurality of frames of images further comprises:
 determining a total movement distance of the to-be-processed object according to an original position and a target position of the to-be-processed object in the to-be-processed image;
 determining a movement distance of the to-be-processed object in each frame of the plurality of frames of images according to a movement mode of the reference animated image, the actual scaling ratio of each frame of the plurality of frames of images, and the total movement distance; and
 generating the plurality of frames of images based on the to-be-processed image, the actual scaling ratio of each frame of the plurality of frames of images, and the movement distance of the to-be-processed object in each frame of the plurality of frames of images, each frame of the plurality of frames of images comprising the to-be-processed object.

4. The method according to claim 3, wherein the movement mode comprises at least one of a rectilinear uniform speed movement mode, a rectilinear variable speed movement mode, a curvilinear uniform speed movement mode, or a curvilinear variable speed movement mode.

5. The method according to claim 1, wherein generating the plurality of frames of images based on the to-be-processed image and the actual scaling ratio of each frame of the plurality of frames of images further comprises:
 determining a rotation angle of each frame of the plurality of frames of images according to a total rotation angle of the reference animated image; and
 generating the plurality of frames of images based on the to-be-processed image, the actual scaling ratio of each frame of the plurality of frames of images, and the rotation angle of each frame of the plurality of frames of images, each frame of the plurality of frames of images comprising the to-be-processed object.

6. The method according to claim 1:
 wherein the method further comprises:
  obtaining an expression detection result of the to-be-processed object based on at least one frame of the plurality of frames of images; and
  adding a corresponding text to the at least one frame of the plurality of frames of images according to the expression detection result, to generate at least one frame of image comprising the corresponding text; and
 wherein composing the plurality of frames of images into the target animated image comprises:
  composing the plurality of frames of images and the at least one frame of image comprising the corresponding text into the target animated image.

7. The method according to claim 6, wherein selecting the reference animated image to be applied to the to-be-processed image comprises one of:
 determining, in response to an operation for the reference animated image, the reference animated image to be applied to the to-be-processed image; or
 recommending, according to the expression detection result, the reference animated image applied to the to-be-processed image.

8. A method for image processing, performed by an electronic device, comprising:
 obtaining a to-be-processed image;
 determining a to-be-processed object in the to-be-processed image, the to-be-processed object comprising at least one of a human face, an animal face, or a cartoon character face;
 selecting a plurality of reference animated images to be applied to the to-be-processed image;
 processing the to-be-processed image according to each of the plurality of reference animated images, to generate a first image sequence of a plurality of frames of images, each of the plurality of frames of images in the first image sequence comprising the to-be-processed object;
 composing each of the plurality of frames of images in the first image sequence into a temporary animated image to obtain an animated image sequence; and
 sequentially splicing each of the temporary animated image in the animated image sequence to obtain the target animated image.

9. The method according to claim 1, further comprising:
 performing an image definition evaluation on the to-be-processed image, to obtain an evaluation result; and
 optimizing image definition of the to-be-processed image according to the evaluation result.

10. The method according to claim 9, wherein optimizing the image definition of the to-be-processed image according to the evaluation result comprises:
optimizing the image definition of the to-be-processed image by using a super-resolution method based on deep machine learning.

11. The method according to claim 1, wherein determining the to-be-processed object in the to-be-processed image comprises:
recognizing one or more objects in the to-be-processed image, to obtain an object quantity in the to-be-processed image;
using the one object in the to-be-processed image as the to-be-processed object when the object quantity is equal to one; and
determining, when the object quantity is greater than one, the to-be-processed object in response to an operation on the to-be-processed image.

12. An apparatus for image processing, comprising a memory for storing computer instructions and a processor in communication with the memory, wherein, when the processor executes the instructions, the processor is configured to cause the apparatus to:
obtain a to-be-processed image;
determine a to-be-processed object in the to-be-processed image, the to-be-processed object comprising at least one of a human face, an animal face, or a cartoon character face;
select a reference animated image to be applied to the to-be-processed image;
determine a maximum scaling ratio of a plurality of frames of images according to an original size of the to-be-processed object and an original size of the to-be-processed image;
determine an actual scaling ratio of each frame of the plurality of frames of images according to a scaling mode and a total frame quantity of the reference animated image, and the maximum scaling ratio;
generate the plurality of frames of images based on the to-be-processed image and the actual scaling ratio of each frame of the plurality of frames of images, each frame of the plurality of frames of images comprising the to-be-processed object; and
compose the plurality of frames of images into a target animated image.

13. The apparatus according to claim 12, wherein:
the scaling mode is a uniform speed scaling mode; and
when the processor is configured to cause the apparatus to determine the actual scaling ratio of each frame of the plurality of frames of images according to the scaling mode and the total frame quantity of the reference animated image, and the maximum scaling ratio, the processor is configured to cause the apparatus to:
determine a first scaling ratio of each frame of the plurality of frames of images according to the maximum scaling ratio, and the total frame quantity; and
decrement the total frame quantity, when the first scaling ratio of each frame of the plurality of frames of images is less than a scaling threshold to obtain an updated total frame quantity, and determine the first scaling ratio according to the maximum scaling ratio, and the updated total frame quantity, until the first scaling ratio of each frame of the plurality of frames of images is not less than the scaling threshold; and
set the actual scaling ratio to the first scaling ratio.

14. The apparatus according to claim 12, wherein, when the processor is configured to cause the apparatus to generate the plurality of frames of images based on the to-be-processed image and the actual scaling ratio of each frame of the plurality of frames of images, the processor is configured to further cause the apparatus to:
determine a total movement distance of the to-be-processed object according to an original position and a target position of the to-be-processed object in the to-be-processed image;
determine a movement distance of the to-be-processed object in each frame of the plurality of frames of images according to a movement mode of the reference animated image, the actual scaling ratio of each frame of the plurality of frames of images, and the total movement distance; and
generate the plurality of frames of images based on the to-be-processed image, the actual scaling ratio of each frame of the plurality of frames of images, and the movement distance of the to-be-processed object in each frame of the plurality of frames of images, each frame of the plurality of frames of images comprising the to-be-processed object.

15. The apparatus according to claim 14, wherein the movement mode comprises at least one of a rectilinear uniform speed movement mode, a rectilinear variable speed movement mode, a curvilinear uniform speed movement mode, or a curvilinear variable speed movement mode.

16. The apparatus according to claim 12, wherein, when the processor is configured to cause the apparatus to generate the plurality of frames of images based on the to-be-processed image and the actual scaling ratio of each frame of the plurality of frames of images, the processor is configured to cause the apparatus to:
determine a rotation angle of each frame of the plurality of frames of images according to a total rotation angle of the reference animated image; and
generate the plurality of frames of images based on the to-be-processed image, the actual scaling ratio of each frame of the plurality of frames of images, and the rotation angle of each frame of the plurality of frames of images, each frame of the plurality of frames of images comprising the to-be-processed object.

17. A non-transitory storage medium for storing computer readable instructions, the computer readable instructions, when executed a processor, causing the processor to:
obtain a to-be-processed image;
determine a to-be-processed object in the to-be-processed image, the to-be-processed object comprising at least one of a human face, an animal face, or a cartoon character face;
select a reference animated image to be applied to the to-be-processed image;
determine a maximum scaling ratio of a plurality of frames of images according to an original size of the to-be-processed object and an original size of the to-be-processed image;
determine an actual scaling ratio of each frame of the plurality of frames of images according to a scaling mode and a total frame quantity of the reference animated image, and the maximum scaling ratio;

generate the plurality of frames of images based on the to-be-processed image and the actual scaling ratio of each frame of the plurality of frames of images, each frame of the plurality of frames of images comprising the to-be-processed object; and
compose the plurality of frames of images into a target animated image.

\* \* \* \* \*